Dec. 20, 1966　　　J. M. QUESTEL　　　3,293,100
METHOD OF DECORATING WITH PLASTIC FILMS
Filed Aug. 27, 1963

INVENTOR.
JOHN M. QUESTEL
BY
Oldham & Oldham
ATTYS.

United States Patent Office 3,293,100
Patented Dec. 20, 1966

3,293,100
METHOD OF DECORATING WITH PLASTIC FILMS
John M. Questel, Cuyahoga Falls, Ohio, assignor to Morgan Adhesives Company, Stow, Ohio, a corporation of Ohio
Filed Aug. 27, 1963, Ser. No. 304,938
1 Claim. (Cl. 156—314)

The present invention is concerned with the application of decorative vinyl sheets and other plastic sheets or films to a base, and to methods for applying the sheets or films.

It is the general object of the present invention to provide new and improved methods for securing vinyl and other plastic sheets and films having grain to a base so that the sheets and films cannot shrink in the direction of the grain, with the methods of the invention being faster, less expensive, and better than known methods.

Another object of the invention is to secure the major portion of a grain type plastic sheet to a base by means of a pressure sensitive adhesive, but to hold in position the ends of the sheet in the direction of the grain by means of a bulk sensitive adhesive comprising a polymer of the plastic sheet.

Another object of the invention is to provide an improved combination involving a base, a decorative plastic sheet, and a combination of a pressure sensitive adhesive and a bulk adhesive for securing the decorative sheet to the base so that the sheet is adequately held against shrinkage.

Another object of the invention is to provide a wrap around plastic sheet on a conical or cylindrical base, the sheet having grain in the direction of the circumference of the base, and wherein the sheet is secured by pressure sensitive adhesive to the base, the ends of the sheet being overlapped and secured together by a bulk adhesive.

The foregoing objects of the invention, and other objects which will become apparent as the description proceeds, are achieved by the combination of a base, a relatively thin plastic sheet having grain, a pressure sensitive adhesive securing the major portion of the sheet to the base, and a bulk adhesive comprising a polymer of the plastic sheet and having before setting between about 15% and about 30% solids in a volatile solvent securing the ends of the sheet in the direction of the grain in place to hold the sheet against shrinkage in the direction of the grain.

Stated in terms of method, the invention utilizes that method of applying a relatively thin vinyl plastic sheet having grain to a base which includes the steps of applying a pressure sensitive adhesive to the major portion of the back of the sheet but leaving at least one end of the sheet in the direction of the grain of the sheet uncovered, covering the pressure sensitive adhesive with a release coat, applying a bulk adhesive comprising a terpolymer of vinyl chloride, vinyl acetate and vinyl maleate having between about 15% and about 30% solids in a volatile solvent to the uncovered end, removing the release coat from the pressure sensitive adhesive before or after the application of the bulk adhesive, and applying the sheet to the base so that the major portion of the sheet is secured by pressure sensitive adhesive to the base but the ends of the sheet in the direction of the grain are held by the bulk adhesive to prevent shrinkage of the sheet in the direction of the grain thereof.

For a better understanding of the invention reference should be had to the accompanying drawings wherein.

Figure 1:
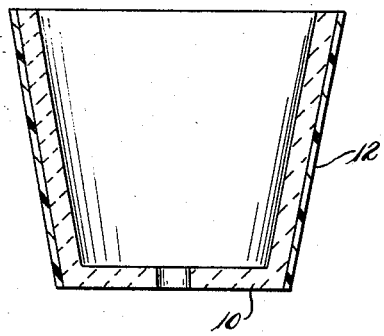
FIGURE 1 is a vertical cross sectional view of a flower pot covered with a decorative vinyl sheet.

In the drawings, the numeral 10 indicates generally a base member to be decorated. In the figure shown the base member 10 is a flower pot of truncated conical shape, this being covered by a decorative plastic sheet 12 having a grain in the sheet, usually caused by the method of manufacturing the sheet, for example calendering or extruding. Preferably the decorative sheet 12 is of vinyl plastic, often a polyvinyl chloride, and the sheet normally will have a thickness between about 2 and about 10 mils, usually in the range of 5 mils in a typical decorative use. The outer surface of the vinyl or plastic sheet 12 is suitably printed or embossed to produce the desired decorative effect.

Figure 2:
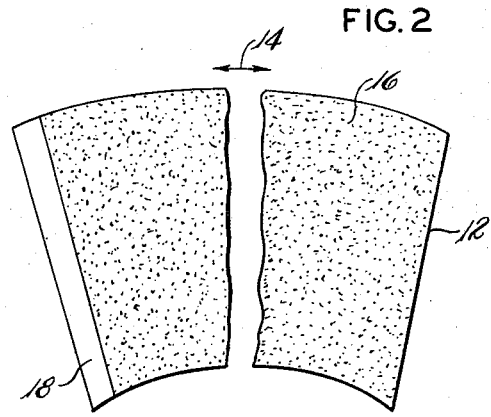
FIGURE 2 is a plan view of the vinyl sheet of FIGURE 1 before it is applied to the flower pot, portions of the sheet being broken away.

Now looking at FIGURE 2 the sheet 12 alone has been illustrated appropriately cut to a crescent shape so that it can properly cover the truncated conical outer surface of the base 10, with the sheet 12 being cut to the indicated shape from a strip of plastic in which the grain of the strip is in the direction of the arrow 14. In accord with the invention the major portion of the sheet 12 is covered as indicated by the dot mottled area with a pressure sensitive adhesive 16 of any well known type, the exact formulation of the pressure sensitive adhesive forming no part of the present invention. At least one end of the sheet 12, as at 18, is left uncovered by the pressure sensitive adhesive. Over the pressure sensitive adhesive 16 is applied a release coat layer of a peel-away paper (not shown) so that the pressure sensitive adhesive is protected after the making of the decorative sheet and until such time as the decorative sheet is ready to be used.

Now in the application of the decorative sheet to the flower pot 10 a bulk adhesive is applied to the end portion 18 of the sheet, the release paper is peeled away from the pressure sensitive adhesive 16, and the sheet 12 is wrapped around the flower pot 10. The pressure sensitive adhesive 16 secures the major portion of the decorative sheet 12 to the pot 10, but the portion 18 of the sheet bearing the bulk adhesive overlaps the other end of the sheet so that the bulk adhesive secures the ends of the sheet together against each other to form a conical band. The bulk adhesive thus holds the sheet from shrinking in the direction of the grain while the pressure sensitive adhesive holds the sheet to the pot over the major portion of the sheet.

Of course, it is possible to remove the release coat of paper from the pressure sensitive adhesive 16 prior to the application of the bulk adhesive to the portion 18 before the application of the sheet 12 to the pot 10. It is also possible to not apply the bulk adhesive to the portion 18 of the sheet 12 until such time as the sheet has been wrapped around the pot 10 and is held in place thereon by the pressure sensitive adhesive, with the bulk adhesive thereafter being applied to the portion 18 which will be then pressed down in overlapping relation with the other end of the plastic sheet 12.

The bulk adhesive to be applied to the uncoated portion 18, particularly when used with a vinyl plastic sheet 12 is, preferably, a terpolymer of vinyl chloride, vinyl acetate, and vinyl maleate having between about 15% and about 30% solids in a volatile solvent, a suitable solvent being methyl ethyl ketone. Stated in another manner, the bulk adhesive should have a viscosity of between about 600 and about 300 cps. The solids in the adhesive comprise usually 90% and 95% of the terpolymer with the remainder being plasticizers and modifiers. A typical modifier to enhance the adhesive action is a nitrile rubber, and any of the usual vinyl plasticizers can be employed.

Figure 3:
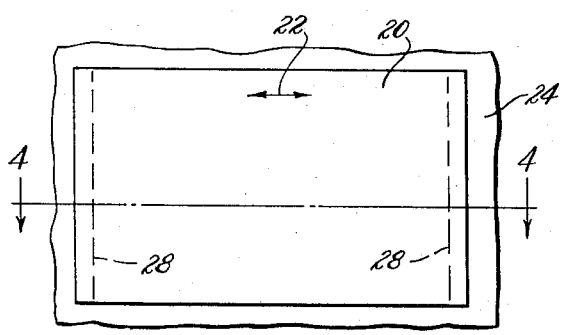
FIGURE 3 is a plan view of a plastic sheet panel secured to a base.
Figure 4:
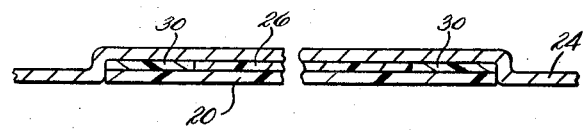
FIGURE 4 is an enlarged fragmentary view in cross section taken substantially on line 4—4 of FIGURE 3.

Coming now to the form of the invention illustrated in FIGURE 3 of the drawings, a decorative sheet 20 of relatively thin plastic having a grain extending in the direction of the arrow 22 is shown adhesively secured to a shallow recess in a base 24. A typical decorative plastic sheet utilized in this capacity is of vinyl or polyvinyl chloride, within the ranges of thickness above set forth. The major portion of the sheet 20 is secured by means of a pressure sensitive adhesive 26 to the base 24, for example between the dotted lines 28, but the ends of the sheet 20 are secured to the base in the regions to the outside of the dotted lines by means of a bulk adhesive 30. The bulk adhesive is of the type above described and serves to hold the sheet 20 against shrinkage in the direction of the grain of the sheet 20, with pressure sensitive adhesive 26 securing the major portion of the sheet 20 to the base 24.

As previously set forth above, in the manufacture of the plastic sheet 20 the pressure sensitive adhesive 26 is applied thereto between the dotted lines 28 and is covered by a release coat of thin paper so that the decorative sheet 20 can be shipped, handled, and the like up to the time of its application to the base 20 at which time the release coat (not shown) is peeled away from the pressure sensitive adhesive before or after the application of the bulk adhesive 30 to the ends of the plastic sheet 20 laying to the outside of the dotted lines 28.

Sometimes it is more convenient and expeditious to apply the bulk adhesive 30 after the main or major portion of the plastic sheet 20 has been applied to the base 24, with the pressure sensitive adhesive holding the major portion of the plastic sheet 20 in position it is an easy matter to turn back the ends of the plastic sheet and apply the bulk adhesive 30 to the ends of the plastic sheet followed by the pressing of the ends of the sheet into position. The very fact that the major portion of the plastic sheet 20 is held in position on the base during this operation is sometimes helpful.

On the other hand, in certain installations it may be advisable to apply the bulk adhesive 30 to the ends of the plastic sheet 20 before the major portion of the plastic sheet is attached by the pressure sensitive adhesive to the base 20. In either event once the plastic sheet 20 is attached in the manner described to the base 24 the major portion of the plastic sheet is held in engagement with the base by the pressure sensitive adhesive, and the ends of the sheet in the direction of the grain are held by the bulk adhesive so as to prevent shrinkage of the sheet in the direction of the grain, namely the arrow 22. The plastic sheet cannot shrink in the direction of the grain and leave any portion of the adhesive exposed which often occurs when only pressure sensitive adhesive is utilized to secure the entire plastic sheet in position.

The combination and method described has the further advantage that the benefits of ease of handling of the decorative sheet with pressure sensitive adhesive are combined with the benefits of strength of the bulk adhesive to provide definite improvement upon either adhesive used alone.

Although the invention has been particularly described in conjunction with thin plastic film having an orientation of the polymer molecules, or grain, at least some of the advantages of the invention are obtained in securing an ungrained or a thicker and stiffer plastic sheet to a curved base wherein the tendency of the sheet to straighten out and left off the base can be prevented by the use of the invention.

While a certain representative embodiment and details have been shown for the purpose of illustrating the invention, it will be apparent to those skilled in this art that various changes and modifications may be made therein without departing from the spirit or scope of the invention.

What is claimed is:

That method of applying to a base a relatively thin vinyl plastic sheet having grain which tends to shrink in the direction of the grain after application which includes the steps of applying a pressure sensitive adhesive which has insufficient strength to overcome the tendency of the sheet to shrink to the major portion of the back of the sheet but leaving at least one end of the sheet in the direction of the grain of the sheet uncovered, applying a bulk adhesive which has sufficient strength to overcome the tendency of the sheet to shrink and having a viscosity between about 600 and about 3000 cps. to the uncovered end, and wrapping the sheet around the base to engage the pressure sensitive adhesive to the base and to engage the bulk adhesive applied to the other end of the sheet whereby the bulk adhesive provides a stronger bond of the ends of the sheet than the tendency of the vinyl to shrink.

References Cited by the Examiner

UNITED STATES PATENTS

| | | | |
|---|---|---|---|
| 1,830,236 | 11/1931 | Metz. | |
| 1,885,345 | 11/1932 | Guthrie | 156—85 |
| 2,095,437 | 10/1937 | Fox | 161—406 |
| 2,440,569 | 4/1948 | Baldwin | 47—34.5 X |
| 2,721,810 | 10/1955 | Schram | 117—45 |
| 2,812,277 | 11/1957 | Hemming et al. | |
| 3,104,498 | 9/1963 | Miller | 47—34 |
| 3,110,554 | 11/1963 | Yazumi | 156—85 |

ALEXANDER WYMAN, *Primary Examiner.*

JACOB STEINBERG, W. POWELL,
*Assistant Examiners.*